United States Patent Office 2,932,662
Patented Apr. 12, 1960

2,932,662

MANUFACTURE OF BIS(β-HYDROXYETHYL) TEREPHTHALATE WITH ETHYLENE OXIDE

Eugene L. Ringwald, Decatur, Ala., assignor to The Chemstrand Corporation, Decatur, Ala., a corporation of Delaware No Drawing. Application August 1, 1958
Serial No. 752,396

5 Claims. (Cl. 260—475)

This invention relates to the manufacture of glycol esters of terephthalic acid, and particularly to the glycol ester of terephthalic acid known as bis(β-hydroxyethyl) terephthalate which is particularly useful in the preparation of synthetic highly polymeric esters.

The polyethylene terephthalate resins possess attractive film- and fiber-forming properties and are commercially prepared today by first ester interchanging ethylene glycol and the dimethyl ester of terephthalic acid to form bis(β-hydroxyethyl) terephthalate and thereafter polymerizing this resulting terephthalate into a high polymer. This method is employed in lieu of what might seem to be the more direct method of simply reacting the terephthalic acid with ethylene glycol because of the fact that this latter method leads to the formation of poor quality polymers and must be carried out under extremely high pressure and temperature conditions. Moreover, as will be perceived, the commonly employed reaction wherein dimethyl terephthalate is a component involves a disadvantage of first forming an intermediate product, and then disposing of the methanol evolved during the ester interchange reaction. The more desirable reaction for preparing bis(β-hydroxyethyl) terephthalate would be that afforded by the direct reaction of terephthalic acid and a reactant without first forming the terephthalate ester and subsequently removing the alcohol by-product.

Because of the difficulty of obtaining glycol esters from the reaction of terephthalic acid directly with ethylene glycol, the production of bis(β-hydroxyethyl) terephthalate by this method has not been commercially practiced. Bis(β-hydroxyethyl) terephthalate is a rather difficult material to obtain directly from terephthalic acid and ethylene glycol because of the fact that terephthalic acid is a highly insoluble material and cannot be brought into soluble form conveniently for reacting with ethylene glycol. In other words, the reaction is regarded as impracticable and consequently bis(β-hydroxyethyl) terephthalate is not produced in this manner.

It is known that ethylene oxide adds to compounds that have an active hydrogen to form hydroxyethyl derivatives. There is described, for example, in British Patent No. 623,669 a method of producing bis(β-hydroxyethyl) terephthalate in which terephthalic acid and ethylene oxide are caused to react in an aqueous medium in the presence of an alkaline catalyst which forms a water-soluble terephthalate therewith. Examples of the catalyst include an alkali metal hydroxide, alkali metal salts, ammonia, ammonia salts and amines. Unfortunately, the yields obtainable by these expedients are still below those found to be commercially attractive. However, by reacting terephthalic acid and ethylene oxide according to the patented process under pressure conditions of 50–100 lbs. per square inch, the time of reaction may be reduced. However, when such high pressures are used the formation of polyethers results. Obviously, the polyethers must be removed and represent a waste of reactants.

According to the present invention, a method has been discovered by which terephthalic acid and ethylene oxide may be reacted to obtain bis(β-hydroxyethyl) terephthalate, which method is highly practical from the standpoint of yield and freedom from contamination by polyether formation. Therefore, the main objective of this invention is to provide a method of producing bis(β-hydroxyethyl) terephthalate under certain controlled conditions which gives a satisfactory yield of the desired product with a minimum amount of polyether type products being produced and at a reasonable reaction rate. Other objects and advantages of this invention will become apparent from the following detailed description.

Generally stated, the invention contemplates the reaction of ethylene oxide and terephthalic acid in water suspension in the presence of a catalyst and under slight pressure. It has been discovered that it is highly important to proportion the amount of the water in relation to the terephthalic acid within definite limits; otherwise, the poor yields of the prior art teachings are encountered. Although known alkaline catalysts that form a water-soluble material with terephthalic acid and accelerate the reaction may be used with success, it has been found that lower aliphatic tertiary amines give superior results in regard to quickness of reaction and particularly to the formation of a high purity bis(β-hydroxyethyl) terephthalate that may be polycondensed to a polymer substantially free of discoloration. However, as just previously indicated, the more important factor in the process of this invention resides in the discovery of the importance of the quantity of water employed in which the terephthalic acid is dispersed. Suitably, when the catalysts suggested herein are employed in carrying out the process, the terephthalic acid-water dispersion may include water in an amount not to exceed three times, in parts by weight, of terephthalic acid. Above this point the yields become unattractive. Generally, at least equal parts by weight of water and terephthalic acid are desirable and necessary in order to produce a dispersion conveniently usable for the reaction. Furthermore, the pressure employed in carrying out the reaction has a marked effect on the results of the reaction. It has been found that in order to produce bis(β-hydroxyethyl) terephthalate at a satisfactory rate without at the same time producing an excessive amount of polyether materials it is important that the reaction between ethylene oxide and terephthalic acid be conducted at a gauge pressure of at least 3 lbs. per square inch and not more than 25 lbs. per square inch. Below the lower limit both the yield and the rate of reaction are low. On the other hand, employing pressures above the upper limit results in the formation of rather large amounts of polyether contaminants.

As indicated above, it has been found that the preferred catalysts are lower aliphatic tertiary amines and include such compounds as trimethyl amine, tripropyl amine, tributyl amine, triallyl amine, dimethyl ethyl amine, diethyl methyl amine, and dimethyl allyl amine, the aliphatic substituents on the nitrogen containing 1–4 carbon atoms. The amounts of these amine catalysts employed may vary between 5 to 40 mol percent based on the mols of terephthalic acid used in the reaction for best results. Below this lower limit the reaction proceeds at an unsatisfactorily slow rate; above this upper limit it is difficult to remove the catalyst from the reaction mixture. It has been found that when triethyl amine is used as a catalyst, a quantity of about 20 mol percent gives excellent results.

The reaction between terephthalic acid and ethylene oxide should be carried out at a temperature of from 70 to 110° C. When temperatures above this upper limit are employed, an excessive amount of polyethers is formed; and when temperatures are below the aforementioned lower limit, the rapidity at which the reaction takes place is undesirably low. The reaction of this invention can be carried out in very simple equipment which may be, for instance, a reaction vessel provided with heating means and internal agitating means. The reactor must be closeable and sufficiently strong to withstand the pressure required. It will be appreciated that a more efficient agitation of the reaction mixture results in a quicker reaction. Furthermore, it is within the scope of the invention to add dispersing aids to the reaction mixture in order to obtain a better aqueous dispersion of the reactants.

The following examples will serve to further illustrate the improvements of the invention and are not to be construed as limiting the invention thereto.

Example I

A mixture of 100 g. of terephthalic acid, 12 g. of triethyl amine, and 200 ml. of distilled water was placed into a one liter reaction flask. The flask was provided with internal agitation means and means for introducing ethylene oxide below the level of the liquid in the flask. The flask was pressurized to 7 p.s.i.g. with nitrogen and vented several times to remove the air therein. The reaction mixture was then heated to a constant temperature of 95–100° C. with intermittent venting of nitrogen to hold the pressure in the system at atmospheric pressure.

The flask was pressurized to 7 p.s.i.g. with ethylene oxide gas. This gas was admitted to the flask at such a rate that 7 p.s.i.g. was maintained until all of the terephthalic acid had reacted with the gas. A clear solution resulted in four hours which indicated completion of the reaction. The hot solution was filtered to remove traces of insoluble particles; and the filtrate containing the formed bis($\beta$-hydroxyethyl) terephthalate was cooled slowly to 25° C. and held at 0–10° C. for several hours. The crystals thus formed were filtered, washed, and dried in a vacuum oven at 50° C. The resulting product was weighed for calculation of yield, and its melting point was determined. It was found that 85 percent of the terephthalic acid had been converted to bis($\beta$-hydroxyethyl) terephthalate with only 1.8 moles of ethylene oxide being used. It was also found that the terephthalate had a melting point of 107–8.

Example II

This example illustrates the effect of varying the water to terephthalic acid ratio employed in the reaction. Series of reactions using water-to-terephthalic acid ratios of 10:1 and 4:1 were carried out under the same conditions and in the presence of the same amine catalyst as described in Example I. Instead of 100 ml. of water, 1000 ml. and 400 ml. of water were used in the reactions. With a ratio of 10:1 it was found that four hours after introducing the ethylene oxide gas into the reaction flask only 66 percent of the terephthalic acid had been converted to bis($\beta$-hydroxyethyl) terephthalate and that 4.2 moles of ethylene oxide has been consumed. With a ratio of 4:1 it was found that four hours after introducing the ethylene oxide gas into the reaction flask only 70 percent of the terephthalic acid had been converted to bis($\beta$-hydroxyethyl) terephthalate and that 2.5 moles of ethylene oxide had been consumed. These results as compared to the data in the above example clearly illustrate that the percentage conversion of terephthalic acid to the terephthalate was adversely affected when these higher water-to-acid ratios were employed. Furthermore, at these ratios the amount of ethylene oxide consumed represents a waste of this reactant. The lower conversion levels also make it necessary to process and recover larger amounts of the expensive and unreacted terephthalic acid.

Example III

This example illustrates the effect of employing higher pressures of 50–100 p.s.i.g. A mixture of 100 g. of terephthalic acid, 12 g. of triethyl amine and 200 ml. of distilled water was placed in a stainless steel autoclave. The system was pressurized to 50 p.s.i.g. with nitrogen and vented several times to remove the air therein. The reaction mixture was stirred and heated to 95–100° C. with the 50 p.s.i.g. of pressure being maintained. Ethylene oxide in liquid form was introduced into the autoclave and reaction with the mixture being stirred therein. The addition rate was regulated to maintain a pressure in the reactor of approximately 90–100 p.s.i.g. After a reaction period of 107 minutes, crude bis($\beta$-hydroxyethyl) terephthalate was recrystallized from the resulting reaction mixture. The amount of terephthalic acid converted to terephthalate was found to be 56.5 percent. In an additional run it was found that employing the amine in amounts of 6 g. resulted in much longer reaction times. In another run, using 30 g. of amine, a product that could not be purified was obtained.

Example IV

Bis($\beta$-hydroxyethyl) terephthalate was prepared in the manner described in Example I except that 10 grams of pyridine was used as a catalyst instead of triethyl amine. In this case the yield, freedom from polyethers, and the reaction rate were comparable to that obtained in Example I.

The purified terephthalates obtained in this example and in Example I were polymerized to polyethylene terephthalate as follows: Bis($\beta$-hydroxyethyl) terephthalate (242 g.) and 0.090 g. of litharge, as catalyst, were placed in a polymerization tube containing an atmosphere of nitrogen. The temperature of the tube was raised to 287° C. by refluxing o-hydroxybiphenyl heating bath. After the terephthalate monomer was melted, the mixture was stirred. Distillation of ethylene glycol began in 15 minutes, and the resulting polymerization was continued for another 15–20 minutes. After polymerization appeared completed, the pressure in the tube was reduced to 1 mm. to remove remaining volatile components. The polymer prepared from the terephthalate monomer that had been produced in the presence of triethyl amine visually had a much whiter appearance than the polymer prepared from the terephthalate monomer that had been produced in the presence of pyridine.

Therefore, the use of the reaction conditions of this invention allows the product of bis($\beta$-hydroxyethyl) terephthalate from terephthalic acid and ethylene oxide in highly economical yields without at the same time the production of polyethers in excessive amounts that would render the terephthalate unsuitable for the manufacture of a polymer having film- and fiber-forming properties. By proper choice of catalyst, the resulting terephthalate monomer may be polycondensed into a polymer having a high degree of whiteness.

It is to be understood that changes and variations may be made without departing from the spirit and scope of the invention as defined in the appended claims.

What is claimed is:

1. In the process of producing bis($\beta$-hydroxyethyl) terephthalate by causing ethylene oxide to react with terephthalic acid in aqueous suspension in the presence of an alkaline catalyst which forms a water-soluble terephthalate therewith, the improvement comprising reacting ethylene oxide and terephthalic acid in an aqueous suspension maintained at a temperature about 70–110° C. and containing water in an amount of at most three times and at least one time the amount of terephthalic acid in parts by weight and under a gauge pressure between 3–25 pounds per square inch.

2. In the process of producing bis($\beta$-hydroxyethyl) terephthalate by causing ethylene oxide to react with terephthalic acid in aqueous suspension in the presence of a tertiary amine catalyst which forms a water-soluble terephthalate therewith, the improvement comprising reacting ethylene oxide and terephthalic acid in an aqueous suspension maintained at a temperature between 70–110° C. and containing water in an amount of at most three times and at least one time the amount of terephthalic acid in parts by weight and under a gauge pressure between 3–25 pounds per square inch.

3. In the process of producing bis($\beta$-hydroxyethyl) terephthalate by causing ethylene oxide to react with terephthalic acid in aqueous suspension in the presence of an alkaline catalyst which forms a water-soluble terephthalate therewith, the improvement comprising reacting ethylene oxide and terephthalic acid in the presence of a catalytic amount of a lower aliphatic amine in an aqueous suspension maintained at a temperature between 70–110° C. and containing water in an amount of at most three times and at least one time the amount of terephthalic acid in parts by weight and under a gauge pressure between 3–25 pounds per square inch.

4. In the process of producing bis($\beta$-hydroxyethyl) terephthalate by causing ethylene oxide to react with terephthalic acid in aqueous suspension in the presence of an alkaline catalyst which forms a water-soluble terephthalate therewith, the improvement comprising reacting ethylene oxide and terephthalic acid in the presence of a catalytic amount of triethyl amine in an aqueous suspension maintained at a temperature between 70–100° C. and containing water in an amount of at most three times and at least one time the amount of terephthalic acid in parts by weight and under a gauge pressure between 3–25 pounds per square inch.

5. In the process of producing bis($\beta$-hydroxyethyl) terephthalate by causing ethylene oxide to react with terephthalic acid in aqueous suspension in the presence of an alkaline catalyst which forms a water-soluble terephthalate therewith, the improvement comprising reacting ethylene oxide and terephthalic acid in the presence of about 20 mol percent of triethyl amine based on the mols of terephthalic acid in an aqueous suspension maintained at a temperature between 70–100° C. and containing water in an amount of at most three times and at least one time the amount of terephthalic acid in parts by weight and under a gauge pressure of about 7 pounds per square inch.

References Cited in the file of this patent

FOREIGN PATENTS

| 623,669 | Great Britain | May 20, 1949 |
| 738,509 | Great Britain | Oct. 12, 1955 |